(12) United States Patent
Rao

(10) Patent No.: US 6,278,798 B1
(45) Date of Patent: Aug. 21, 2001

(54) IMAGE OBJECT RECOGNITION SYSTEM AND METHOD

(75) Inventor: Kashipati G. Rao, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/104,462

(22) Filed: Aug. 9, 1993

(51) Int. Cl.$^7$ ................................................ G06K 9/62
(52) U.S. Cl. .......................................... 382/154; 382/216
(58) Field of Search ........................... 381/1, 41, 45–47, 381/30, 34, 36, 22, 100, 103, 154, 199, 209, 216, 224, 285, 294

(56) References Cited

U.S. PATENT DOCUMENTS

| | | | |
|---|---|---|---|
| 5,123,057 | * 6/1992 | Verly et al. | 382/37 |
| 5,210,799 | * 5/1993 | Rao | 382/22 |
| 5,214,721 | * 5/1993 | Fukuhara et al. | 382/56 |

OTHER PUBLICATIONS

Strang, "Linear Algebra and its Applications", 1988, pp. 444–449.*
Huttenlocher, "Recognizing Solid Objects by Alignment with an Image" Intl. J. Comp. Vision, 5:2, 195–212 (1990).*
Lowe "Fitting Parameterizod 3D Models to Images" IEEE PAMI vol. 13, No. 5 1991 pp 441–450.*
Jacobs, "Optimal Matching of Planes models in 3D Scenes", IEEE, pp 269–274 (1991).*
Yamamoto, "A Segmentation Method Based on Motion From Image Sequence and Depth." Proc. of $10^{th}$ Int. Conf. on Pattern Recognition, vol. 1, pp. 230–232, Jun. 1990.*
Chien et al. "Interative Autoassociative Memory Models for Image Recalls and Pattern Classification." IEEE Joint Conf. on Neural Networks, vol. 1, pp. 30–35, Nov. 1991.*
Chao et al. "Pseudo–Inverse with Increasing Threshold: an Error–Recovery Pattern Recognition Algorithm." RNNS/IEEE Symposium on Neuroinformatics and Neurocomputers, vol. 2, pp. 888–894, Oct. 1992.*
Chao et al. "Combined Orthogonal Vector and Pseudo–Inverse Approach for Robust Pattern Recognition." RNNS/IEEE Symposium on Neuroinformtics and Neurocomputers, vol. 2, pp. 881–887, Oct. 1992.*
"An Anglytical Solution for the Perspective 4–Point Problem", Horaud et al. IEEE Computer Vision and Pattern Recognition, 1989.*

* cited by examiner

*Primary Examiner*—Jon Chang
(74) *Attorney, Agent, or Firm*—Carlton H. Hoel; W. James Brady; Frederick J. Telecky, Jr.

(57) ABSTRACT

A pseudo-inverse derived model-point-to-image-point transformation hypothesis generator as could be used in a computer vision system. Preferred embodiments include generation of n-point transformations directly from n point pair sets and generation of n-point transformations from sets of n point pairs defined by a preliminary three-point transformation plus sets of (n−3) points having minimal error with respect to the three-point trnasformation. Systems include salient corner extraction and hypothesis transformation verification by further sets of point pairs.

14 Claims, 5 Drawing Sheets

IMAGE OBJECT RECOGNITION SYSTEM AND METHOD

CROSS-REFERENCE TO RELATED APPLICATIONS

The following applications contain subject matter related to the present application and are assigned to the assignee of the present application: Ser. No. 07/850,717, filed Mar. 13, 1992 (K. Rao) now abandoned.

BACKGROUND OF THE INVENTION

The invention relates to digital image processing, and, more particularly, to a system for recognition of three-dimensional objects in a two-dimensional image and the method of recognition.

Computer vision includes the automatic machine recognition and localization of three-dimensional objects from two-dimensional images. FIG. 1 shows a computer vision system 100 with passive sensor 102, digitizer 104, recognition processor 106, and output 108. Passive sensor 102 may include a TV camera or an infrared imager for night vision; digitizer 104 may be a sampling analog-to-digital converter or may be partially incorporated into sensor 102 in the case of a CCD sensor. Recognition processor 106 analyzes the image from sensor 102 to determine the presence of certain target objects in the scene. Output 108 may be a display of recognized targets or may feed a controller for flight as in automatic target recogntion in a smart missle. Recognition processor 106 may use various target recognition systems.

Known target recognition systems include recognition by global features such as Fourier transform descriptors, moments, silhouette-based features, and so forth. These systems presume an open target. However, for images of target objects which may be partially occluded or with low signal-to-noise ratios the extraction of such global features may not be possible.

Alternative to global feature recognition is local feature recognition. Huttenlocher and Ullman, Recognizing Solid Objects by Alignment with an Image, 5 Int'l. J. Comp. Vision 195 (1990) and Lowe, Three-Dimensional Object Recognition from Single Two-Dimensional Images, 31 Artif. Intell. 355 (1987) describe model-based recognition approaches using vertices and edges. The model-based approach matches stored geometric models against features extracted from an image. Recognition of an object within an image entails finding a transformation (rotation, translation, perspective projection) from a set of features of a model of the object to a set of corresponding features extracted from the image. The larger the sets of model and image features, the better the match. Note that Huttenlocher and Ullman use a weak perspective projection in which the depth of objects is presumed small so the perspective is orthgraphic projection plus a common scale factor for all objects to account for distance. They compute hypothesized transformations from sets of three pairs of model and image points (corners) and verify the transformations with edge contour matches as follows. Given three pairs of points $(a_m, a_i)$, $(b_m, b_i)$, and $(c_m, c_i)$, where the image points (subscript "i") are in two-dimensional sensor coordinates and the model points (subscript "m") are in three-dimensional object coordinates. First, rotate and translate the model so that the new a, is at the origin (0,0,0) and the new $b_m$ and $c_m$ are in the x-y plane. This operation is poerformed offline for each triple of model points.

Next, define the translation vector $b=-a_i$, and translate the image points by b so that the new $a_i$ is at the origin (0,0), the new $b_i$ is at old $b_i-a_i$ and the new $c_i$ is at old $c_i-a_i$.

Then, solve for the 2 by 2 linear transformation L with matrix elements $L_{ij}$ so that $Lb_m=b_i$ and $Lc_m=c_i$. The translation b and linear transformation L define a unique affine transformation A as long as the three model points are not collinear.

Further, compute $c_1$ and $c_2$ as:

$$c_1 = \pm[w+(w^2+4q^2)^{1/2}]^{1/2}/2^{1/2}$$

$$c_2 = -q/c_1$$

where $w=L_{12}^2+L_{22}^2-(L_{11}^2+L_{21}^2)$ and $q=L_{11}L_{12}+L_{21}L_{22}$.

Lastly, form the 3 by 3 matrix sR as:

$$\begin{matrix} L_{11} & L_{12} & (c_2 L_{21} - c_1 L_{22})/s \\ L_{21} & L_{22} & (c_1 L_{12} - c_2 L_{11})/s \\ c_1 & c_2 & (L_{11}L_{22} - L_{21}L_{12})/s \end{matrix}$$

where $s=[L_{11}^2+L_{21}^2+c_1^2]^{1/2}$. This yields the complete transformation with translation vector b and scale and rotation sR. The image coordinates of a transformed model point, $p'=sRp+b$, are then given by the x and y coordinates of p'.

In contrast, Lowe uses a full perspective and feature groupings (parallelism, collinearity, and end point proximity) of edges to trigger Newton-Rapheson method computation of hypothesized transformations.

U.S. Pat. No. 5,173,946 (K. Rao) discloses a corner matching and distance array method of image matching.

The foregoing items are hereby incorporated by reference.

SUMMARY OF THE INVENTION

The present invention provides a model-based recognition system which uses pseudo-inverse generated hypothesized transformations based on sets of four or more pairs of model and image points. Various preferred embodiments employ further pairs of points for transformation verification and also incorporate a preliminary three-point transformation as part of the hypothesized transformation generation.

BRIEF DESCRIPTION OF THE DRAWINGS

The drawings are schematic for clarity.

DESCRIPTION OF THE PREFERRED EMBODIMENTS

First Preferred Embodiment Overview

Figure 1:
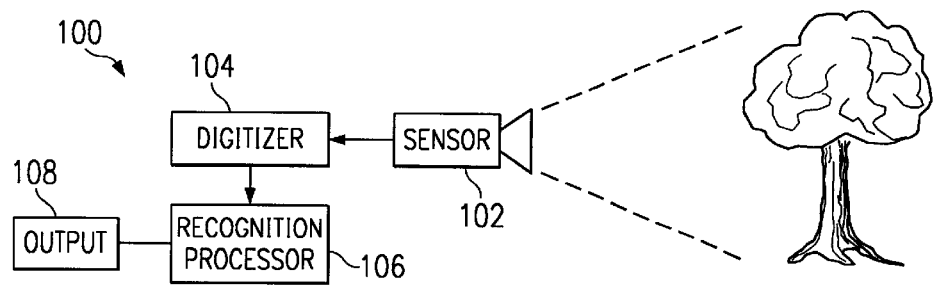
FIG. 1 shows a known computer vision system.
Figure 2:
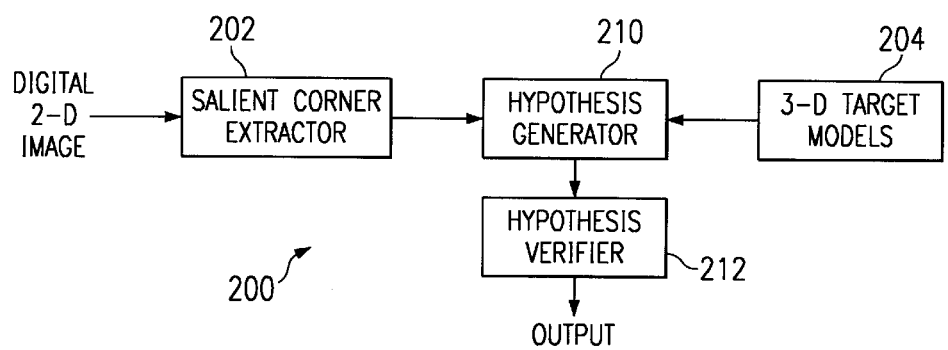
FIG. 2 illustrates a first preferred embodiment system in functional block form.

FIG. 2 shows in block diagram view the first preferred embodiment system of object recognition, generally referred to by reference numeral 200, as including a salient corner extractor 202, three-dimensional target object model storage 204, hypothesis generator 210, and hypothesis verifier 212. System 200 could be used as the recognition processor of the computer vision system illustrated in FIG. 1. System 200 is a model-based recognition system and in effect matches sets of corners of items in an input two-dimensional image with at sets of corners of stored models of target objects. If a good match is found, then system 200 indicates which target object has been found, but if no good match is found, then system 200 indicates that the image contains no target objects.

Salient corner extractor 202 extracts salient corners from an input two-dimensional digital image. Model storage 204 contains lists of three-dimensional vertex locations for models of the target objects which system 200 should be able to recognize in an input two-dimensional digital image. Hypothesis generator 210 takes a set of salient corners in the input image as derived by extractor 202 and a set of vertices from a single model in storage 204 and computes a best fit transformation (rotation, translation, and scaling) of the model which will project the set of model vertices close to the set of image corners. Hypothesis generator 210 considers all combinations of sets of input image corners and model vertices, and computes an error measure for each derived transformation. Only the transformation with the smallest error measure is retained, or alternatively, the transformations with error measure below a threshold are retained. Hypothesis verifier 212 verifies each of the retained transformations by selecting further vertices from the model and projecting these vertices to the image by the transformation and then computing the closeness of these further projected vertices to extracted corners. If the projected vertices are close enough, then system 200 indicates that the model object has been found in the image. Contrarily, when all transformations fail verification, then system 200 indicates that no target objects are present in the image.

The following sections provide details of each of the blocks of FIG. 2.

Salient Corner Extractor

Figure 3:
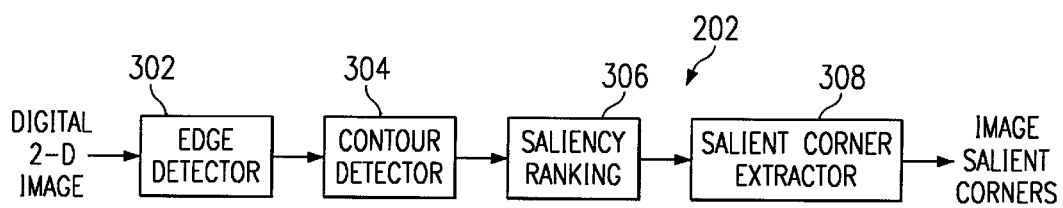
FIG. 3 shows saliency extraction in functional block form.

System 200 operates on corners as the image features of interest because corners are local and thus will not be altered by occlusion in an image. FIG. 3 illustrates the operation of salient corner extractor 202 in functional block format. In particular, corner extractor 202 proceeds as follows. First, edge detector 302 processes the input digitized image to find the edge pixels (edgels) in the image. This can be performed with standard harware (e.g., a microprocessor such as Intel 486, Motorola 68040, . . . together with RAM and ROM) running simple software or with more sophisticated hardware and software (e.g., a Lisp machine or a multiprocessor machine with parallel operaion) or even with specialized hardware which is hardwired to perform the computations. Canny, A Computational Approach to Edge Detection, 8 IEEE Tran. Pattern Analysis and Machine Intelligence 678-679 (November 1986) details an edge detection method.

Contour detector 304 processes the edgels found by edge detector 302 to identify countours, which are just lists of linked (abutting) edgels. Again, standard hardware with simple software may be used; indeed, the same hardware as for the edge detector with additional software for the contour detection suffices. This is also the case for the other functional blocks.

Next, saliency ranker 306 assesses the saliency of each contour found by contour detector 304 by measuring the contour's relative length, the contour's relative smoothness, and the contour's relative contrast. Rao and Liou, Salient Contour Extraction for Target Recognition, SPIE 1991 Int'l. Symp. Exh. Optical Engineering and Photonics in Aerospace Sensing (April 1991) describes such saliency measures and ranking and is hereby incorporated by reference. In particular, the relative contour length measure for a contour of length L can be $(L-L_{MIN})/(L_{MAX}-L_{MIN})$ where $L_{MAX}$ is the length of the longest contour and $L_{MIN}$ is the length of the shortest contour; the relative smoothness measure of a contour with average change of curvature $\Delta\kappa$ can be $(\Delta\kappa_{MAX}-\Delta\kappa)/(\Delta\kappa_{MAX}-\Delta\kappa_{MIN})$ where $\Delta\kappa_{MAX}$ is largest average change of contour for all of the contours and $\Delta\kappa_{MIN}$ is the smallest average change of contour; and the relative contrast measure of a contour of average contrast C can be $(C-C_{MIN})/(C_{MAX}-C_{MIN})$ again with $C_{MAX}$ the largest average contrast and $C_{MIN}$ the smallest. Compute the curvature at each contour edgel by using a B-spline fit, and compute the change of curvature by the second difference (in the form of convolution with (-1 2 -1) on adjacent edgels). The average contrast is just the average edgel strength (as obtained by the edge detector 302) for the edgels comprising the contour. Saliency ranker 306 adds these three measures to generate a saliency measure and orders the contours according to saliency.

Figure 4A:
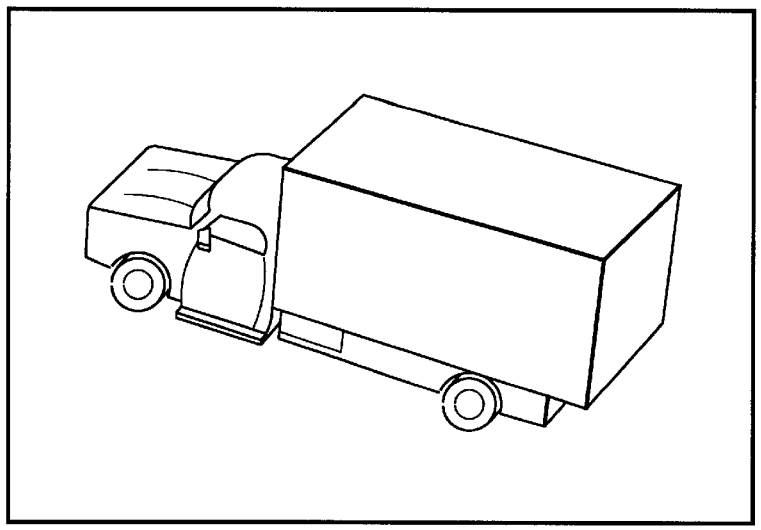
FIGS. 4a–c illustrate contour extraction.
Figure 4B:
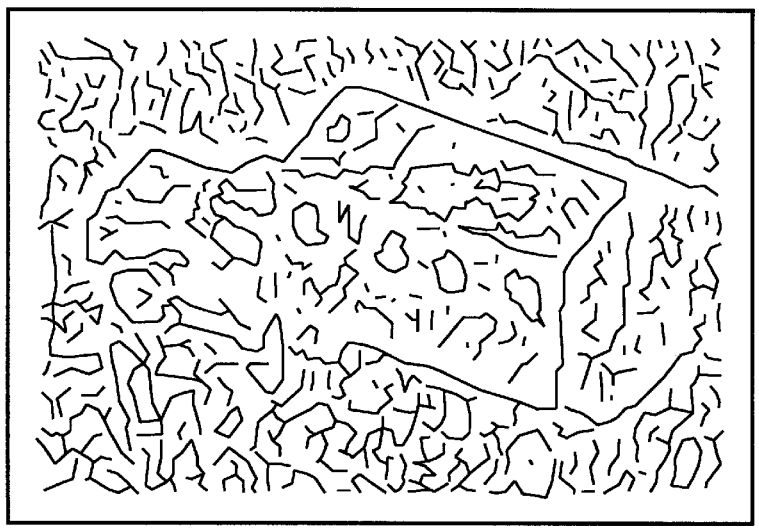
Figure 4C:
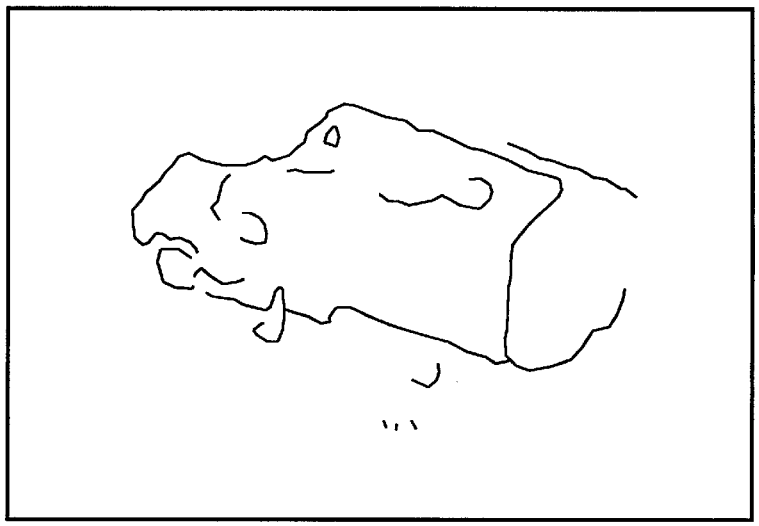
Figure 5A:
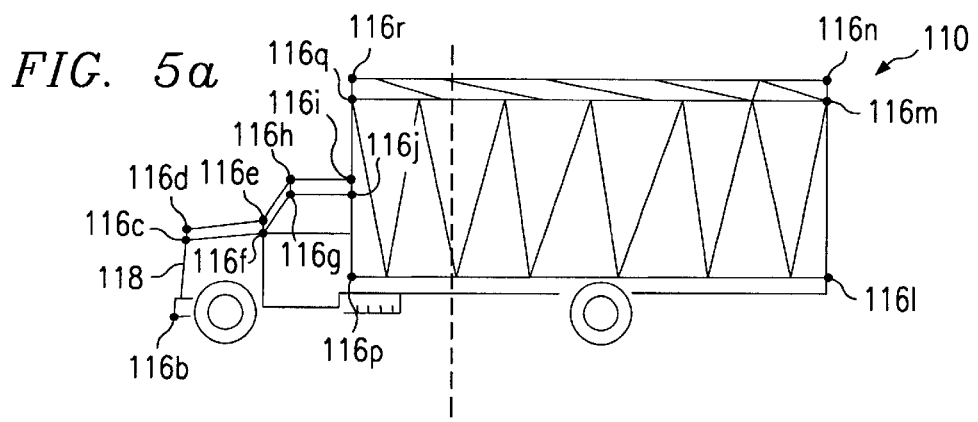
FIGS. 5a–f are views of a model from various directions.
Figure 5B:
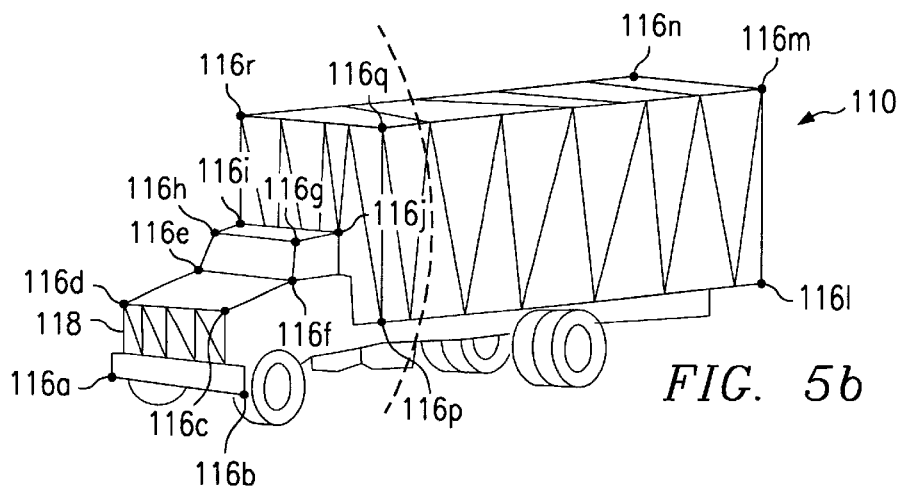
Figure 5C:
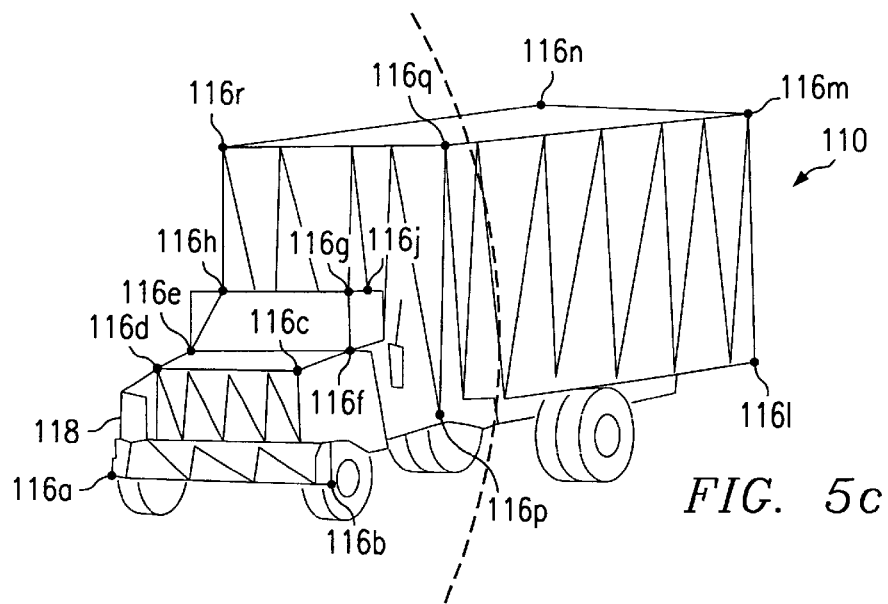
Figure 5D:
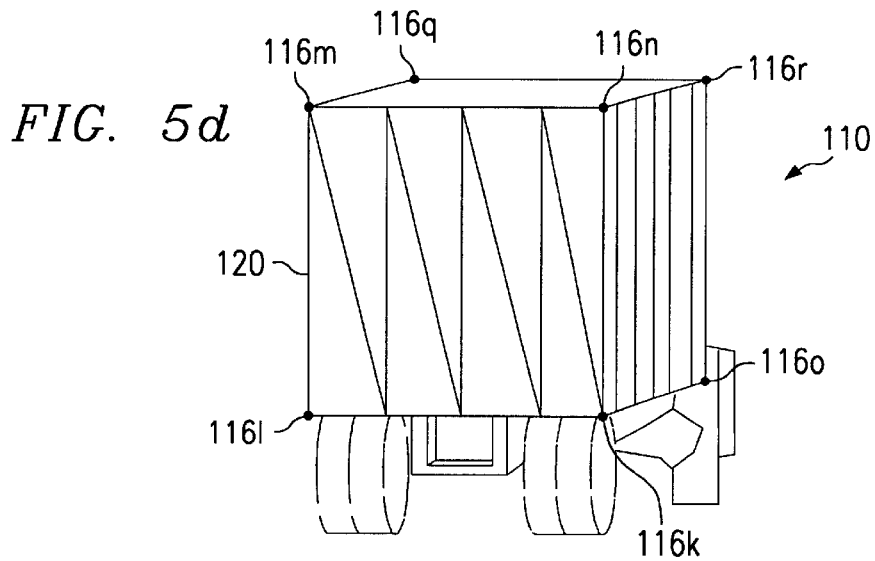
Figure 5E:
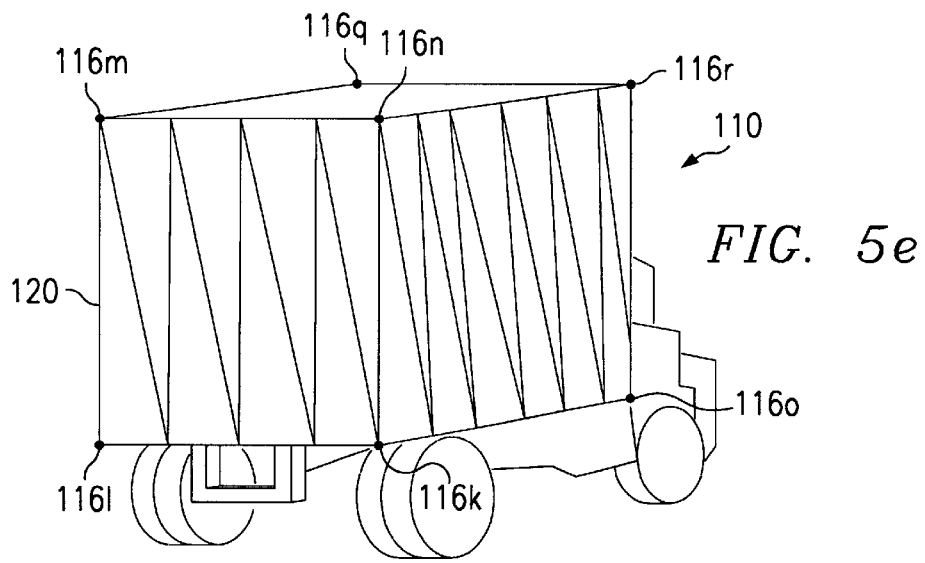
Figure 5F:
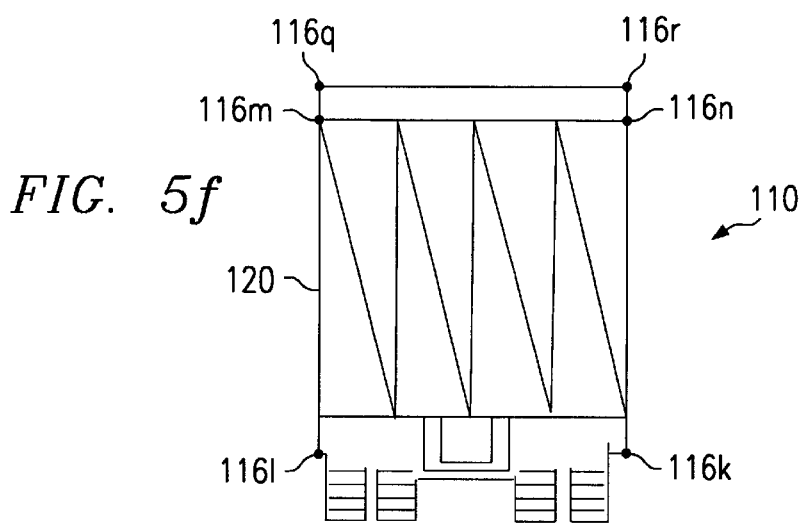

Salient corner detector 308 processes each contour having a saliency measure of greater than a preset threshold (which defines the salient contours) to find salient corners. Corners correspond to edgels with large curvature (above a preset threshold). That is, salient corner detector 308 generates a list of image points which are the corners of the salient contours extracted from the input image. The use of corners from only salient contours reduces the number of comers to be considered and thus shrinks the search space and computation time at the cost of accuracy. FIGS. 4a–c illustrate the salient contour extraction: FIG. 4a is the digitized two-dimensional image; FIG. 4b shows the output of the edge detector 302; and FIG. 4c shows the extracted salient contours. The contours of FIG. 4c then have their comers extracted to form the list of image points. The list of salient corners has N members with N on the order of 20. When the number of corners becomes too large, the threshold for saliency can be increased.

Model Storage

Model storage 204 contains a list of three dimensional model points for each of the target objects. In particular, to generate a list of three dimensional model points just select vertices of a target object. FIGS. 5a–f show a triangulated model of a truck from various directions and with vertices indicated. Note that FIGS. 5a–f are two-dimensional projections of the three-dimensional model. These points can be grouped into sublists of model points according to portions of the model object, such as the cab portion or the body portion of the truck. This will increase the number of (partial) models but will shrink the number of model points in each model and permit recognition of partially occluded objects. That is, if trees occlude the truck body in the input image, then the partial model of the truck cab alone will provide sufficient information for a recognition.

Let K be the number of (partial) model objects (K may be on the order of 10) and each (partial) model has at most M vertices with M typically on the order of 20.

The lists of model points can be physically stored in nonvolatile semiconductor memory such as Flash EEPROM and thereby be available for rapid processor access.

Hypothesis Generator

Figure 6:
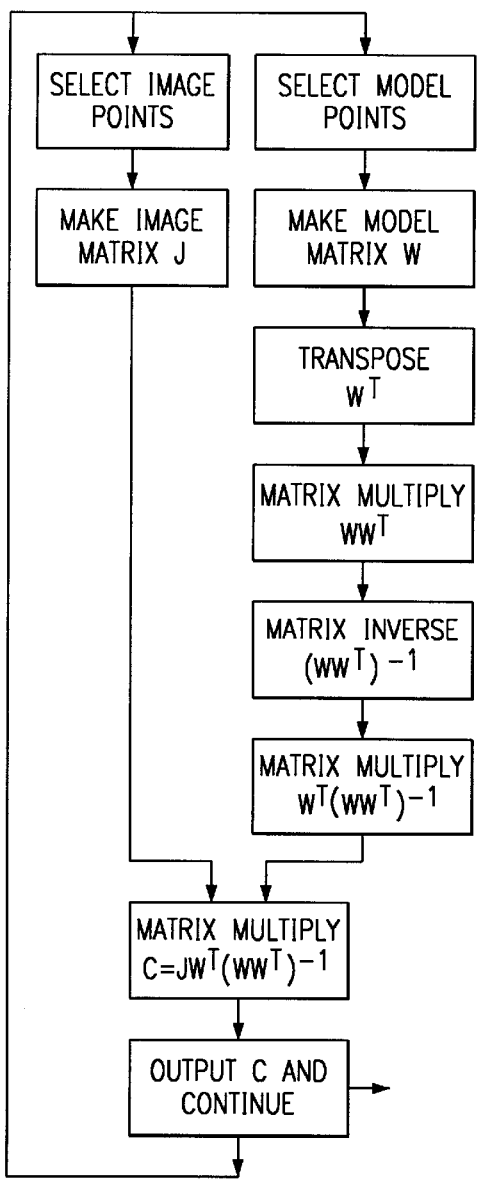
FIG. 6 is a flow diagram for hypothesis generation.

Hypothesis generator 210 has an input from extractor 202 in the form of a list of two-dimensional image points (salient corners of an image) and another input from storage 204 in the form of lists of three-dimensional model points (vertices of the stored models or partial models). Let N be the number of entries in the list of image points with each entry of the form $(u_j, v_j)$ for $u_j$ and $v_j$ just the rectangular coordinates of the jth image point in the image. Similarly, a list of model points has at most M entries with each entry of the form $(x_j, y_j, z_j)$ for a vertex in three-dimensional space. Hypothesis generator then analyzes the inputs heuristically as follows and as illustrated in flow chart FIG. 6.

First, pick a set of n (n typically equals 5) of the image points from the input list of image points and pick a set of n of the model points from an input list of model points all associated with the same (partial) model.

Next, form a 3×n image matrix J from the set of n image points $(u_1, v_1), (u_2, v_2), (u_3, v_3), \ldots, (u_n, v_n)$ as $$J = \begin{matrix} u'_1 & u'_2 & u'_3 & \cdots & u'_n \\ v'_1 & v'_2 & v'_3 & \cdots & v'_n \\ w & w & w & \cdots & w \end{matrix}$$

where $u_j'=u_j$ with w the scale factor for the weak perspective projection.

Similarly, form a 4×n model matrix W from the set of n model points $(x_1,y_1,z_1)$, $(x_2,y_2,z_2)$ ... $(x_n,y_n,z_n)$ as $$W = \begin{matrix} x_1 & x_2 & x_3 & \cdots & x_n \\ y_1 & y_2 & y_3 & \cdots & y_n \\ z_1 & z_2 & z_3 & \cdots & z_n \\ 1 & 1 & 1 & \cdots & 1 \end{matrix}$$

where the dummy row of 1s provides for translation of the image.

Then determine a 3×4 matrix camera matrix C with entries $c_{ij}$ so that in some sense CW=J, and matrix C will be a transformation of the n model points (W) into the n image points (J). Of course, CW=J represents a system of 3n linear equations for 12 unknowns (the 12 entries of matrix C); w is not an independent unknown because w can be divided out of all of the equations to form an inhomogeneous system for the unknowns $c_{ij}/w$. Hence, for n equal to 1, 2, or 3 the system is underdetermined with an infinite number of solutions, but for n=4 there are 12 equations and a unique solution if the determinant of W is nonzero. However, this solution may be unstable and not robust.

Hypothesis generator 210 takes n to be at least 5. Indeed, n in the range of 5 to 7 seems a good tradeoff of accuracy and computational load. Thus there are at least 15 equations for the 12 unknowns and the system is overdetermined. So compute a matrix C by the pseudo-inverse method as follows: (i) form $W^T$, the n×4 transpose of W; (ii) matrix multiply W and its transpose to from the 4×4 matrix $WW^T$; (iii) compute $(WW^T)^{-1}$, the inverse of $WW^T$; (iv) matrix multiply the transpose by the inverse to form $W^T(WW^T)^{-1}$; and lastly, (v) matrix multiply to have the matrix C defined as:

$$C=JW^T(WW^T)^{-1}$$

Thus for each J and W, matrix C can be computed and constitutes a tentative hypothesis that the selected set of n model points correspond (via the matrix C transformation) to the selected set of n image points. Multiplying the matrices consumes the bulk of the computation time and increases as $O(n^2)$.

Of course, CW=J typically does not hold because the system of linear equations is overdetermined, but matrix C always exists (unless, for example, the model points are collinear). In fact, matrix C provides a transformation of the n model points (W) to n hypothesized points (CW) in the image plane which are related to the n image points (J) by a minimal sum of squares of distances. Thus the magnitude of CW−J (in the sense of the sum of the squares of the elements) provides a measure of the error of C from a transformation of the n model points to the n image points. When the n model points do transform exactly to the n image points, then error will be (close to) zero and CW=J will indeed hold. Note that noise, roundoff, orthographic projection, and other errors will typically imply an image error even for the matrix C computed from corresponding model and image points. In short, a set of n model points and n image points leads to a tentative matrix C plus an error measurement. The tentative matrix C with the smallest error could be used as an indication of the corresponding model being recognized in the input image if the error is less than a predetermined threshold. This would avoid the computations of hypothesis verifier 212, but provide less accuracy.

For each set of n image points and n model points (from a single (partial) model), compute the tentative matrix C and its error. These matrices C with error measures are the output of hypothesis generator 210. The matrices C with error measures exceeding a predetermined error threshold may be discarded to lessen subsequent computation load. Note that there are on the order of KM!N!/(M−n)!(N−n)!n! different tentative matrices C. For n=5 and with M and N much larger than 5, this is roughly $KM^5N^5/5!$. Thus M and N must be kept relatively small to have reasonable computation time. Indeed, for M and N equal to 20, $M^5N^5/5!$ is on the order of $10^{11}$.

Hypothesis generator 210 may include hardwired circuitry for doing its computations or may include standard programmable processors (e.g., Intel 80486, Motorola 68040, ... ) running software which provides the computations or may include more powerful processors such as a Lisp machine. In particular, the Appendix contains a listing of a Common Lisp program (for the Texas Instruments Explorer) which performs such computations.

Note that in general there are six variables for a transformation of a model to an image object (three rotation angles, two image translation directions, and a scale factor), and each model point-image point correspondence provides two relations among the variables (one relation for the horizontal image point coordinate and one relation for the vertical image point coordinate). Thus three model points corresponding to three image points are needed if no other presumptions are made. See the Huttenlocher and Ullman reference or the cross-referenced patent application.

Hypothesis Verifier

Hypothesis verifier 212 checks (in parallel) each hypothesized matrix C from hypothesis generator 210 by applying the C transformation to m more model points from the same (partial) model used to generate matrix C; this generates a set of m hypothesized image points. The least squares distance between these m hypothesized image points and a set of m additional image points provides an error measure, and the smallest error over all sets of m additional image points is taken as a preliminary verification error for C. Hypothesis verifier 212 computes this preliminary verification error for all sets of m further model points from the same (partial) model, and the smallest preliminary verification error provides a final verification error measure. Thus each C has a total error made of the final verification error plus the original error measure from hypothesis generator 210. The matrices are ranked according to total error size, and if the matrix C with the smallest total error has a total error less than a preset threshold, then hypothesis verifier 212 verifies matrix this C as a correct transformation of all n+m model points to n+m image points and recognizes the associated model object as present in the image. Contrarily, if hypothesis verifier 212 does not find a small enough error, it concludes that the model object is not present in the image.

The computations of the verification error and total error for all the matrices C from hypothesis generator 210 may be effectively implemented with hardware and software capable of parallel computations.

A display can show the decision of hypothesis verifier 212. Of course, the object to be recognized in the image may be partially occluded, so not all model points will have corresponding image points even for the correct model. Consequently, m will be taken to be about the same as n, and the number of verification computations roughly will be (M−n)!(N−n)!/(M−n−m)!(N−n−m)!m!. A verification computation will be much quicker than a matrix C computation because the matrix multiplication need not be computed in the verification.

Alternative Embodiment

An alternative embodiment hypothesis verifier 212 lessens the computational load by considering the matrices C from hypothesis generator in rank order and selecting the first matrix C which provides a total error less than a predetermined threshold. In particular, the matrices C from hypothesis generator 210 may be ranked ordered according to error size, the smallest error providing the first ranking.

Then hypothesis verifier 212 iteratively considers each matrix C in rank order and computes its n+m point error (total error) by the minimum sum of squares of distances between pairs of m points for sets of m additional hypothesized image points and sets of m additional image points, as with the verification error described in the previous section. Hypothesis verifier 212 outputs the first matrix C found with an n+m point error less than a predetermined threshold. If none of the matrices C has an n+m point error below threshold, then hypothesis verifier 212 outputs a statement that no model object can be recognized in the image.

Serial computation is effective with this iterative approach because the most likely matrices C are verified first and once a viable matrix C is found, no further computations need by made.

Three-point Alignment Embodiment

Figure 7:
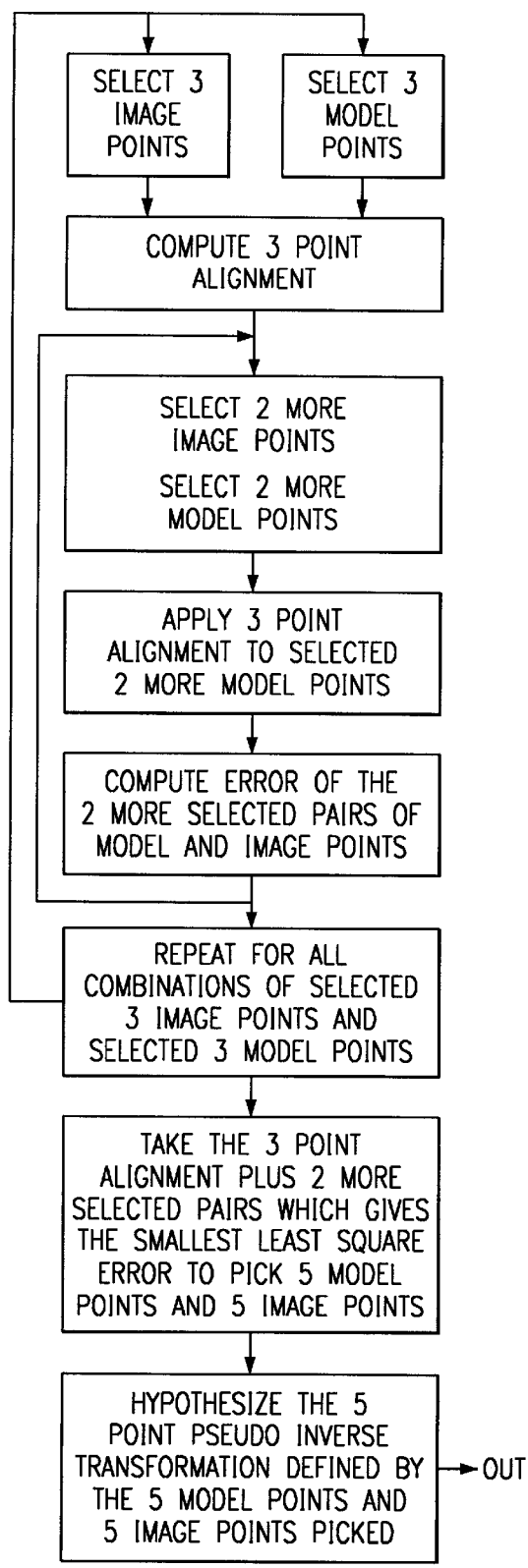
FIG. 7 is a flow diagram for second preferred embodiment hypothesis generation.

A second preferred embodiment proceeds as illustrated in flow chart FIG. 7. This method essentially begins with a three point alignment as in Huttenlocher and Ullman, then finds k more matching points by applying the three point alignment to sets of k more model points (from the same model as determined the alignment transformation) and selecting the least squares error with respect to sets of k more image points analogous to the operation of hypothesis verifier 212, and lastly takes the sets of three plus k points to compute a matrix C as in the first preferred embodiment. Typically, k will be taken equal to 2 or 3 or 4 in order to limit computation. This matrix C provides a more accurate transformation than the initial three point alignment because all three plus k points in each set enter the computation with equal weight, and this provides a robust determination of matrix C. This matrix C then may be fed into hypothesis verifier 212 for verification with m more model points as in the first preferred embodiment.

In more detail, first, extract salient corners from a digitized input image as described in the foregoing Salient Corner Extractor section to form the list of image points, and have stored lists of vertices of the target (partial) models as the model points as described in the foregoing Model Storage section. Then for each set of three image points plus three model points from a single model, follow Huttenlocher and Ullman pages 200–201 to compute a transformation of the three model points into the three image points (a three-point alignment) as described in the Background of the Invention.

Then for each three-point alignment find two more corresponding model points and image points as follows. If T is the three-point alignment transformation determined by $T(x_1,y_1,z_1)=(u_1,v_1)$, $T(x_2,y_2,z_2)=(u_2,v_2)$, and $T(x_3,y_3,z_3)=(u_3,v_3)$, then for each pair of model points $(x_j,y_j,z_j), (x_k,y_k,z_k)$ in the same model as $(x_1,y_1,z_1), (x_2,y_2,z_2)$, and $(x_3,y_3,z_3)$, define points $(r_j,s_j)$ and $(r_k,s_k)$ in the image plane by $T(x_j,y_j,z_j)=(r_j,s_j)$ and $T(x_k,y_k,z_k)=(r_k,s_k)$. Then for each pair of image points $(u_i,v_i), (u_m,v_m)$ compute the least squares error, $$(u_i-r_j)^2+(u_m-r_k)^2+(v_i-s_j)^2+(v_m-s_k)^2$$

Next, select the transformation T plus corresponding pair of model points $(x_j,y_j,z_j), (x_k,y_k,z_k)$ and corresponding image points $(u_i,v_i), (u_m,v_m)$ which give the smallest least squares error. Thus the selected T plus corresponding pair of model points and pair of image points define a set of 5 model points and corresponding 5 image points (i.e., the three point pairs determining T plus the corresponding error minimizing two pairs). Use this set of 5 model points and corresponding 5 image points to compute a transformation matrix C by the pseudo-inverse methods as described in the foregoing Hypothesis Generator section. In effect, matrix C is a redetermination of the selected smallest two extra point least squares error transformation T. However, C provides a more robust determination of the transformation and more tolerance to noise and occlusion through the use of 5 model and 5 image points.

Lastly, hypothesis verifier 212 verifies this transformation matrix C as described in the foregoing Alternative Embodiment section. If hypothesis verifier 212 rejects a transformation matrix C, then the second smallest least squares error transformation T and pairs of model and image points can be used to generate another matrix C, as previously described. In this manner a pool of transformations T (possibly with repeats) plus associated pairs of model and image points which pass a threshold least squares error test can be used to define a pool of matrices C. Hypothesis verifier 212 then checks all of the matrices C in this pool for the one with the least squares error, if any. And the best acceptable matrix C thus again defines the model recognized in the image.

Again, with parallel computation by hypothesis verifier 212, all transformations T plus corresponding pair of model and image points could be used to compute a group of matrices C, and all of the matrices C verified in parallel as in the foregoing Hypothesis Verifier section. Then the matrix C with the smallest total error, if below threshold, would generate an indication of the corresponding model object being recognized in the input image, otherwise an indication of no object recognized.

Also, the C with the minimal CW–J error alone could be used for model object recognition in the input image to avoid the computations of hypothesis verifier 212, but would provide less accuracy.

Matrix C Computation

The Appendix lists a Common Lisp program for computing matrix C from lists of input model points (mp1) and image points (ip1) and allows choice of either orthographic projections or full perspective projections.

Modifications and Variations

The preferred embodiments may be varied in many ways while retaining one or more of the features of a pseudo-inverse determination of a model-to-image transformation matrix from an overdetermined set of model and image points. The number of points used for the hypothesis transformation must be at least 4 for the pseudo-inverse, but can be any larger number with 5–7 points being a good compromise of accuracy (better with more points) and computational cost (better with fewer points). The hypothesis transformation verification could be with image features other than corners, such as contour portions. The least squares assessment of best hypothesized transformation could be any other measure of deviation, such as sum of absolute values. Similarly, the verification error measurements may be by other metrics, such as absolute values; indeed, the total error may be computed by other metrics such as a sum of squares of n+m point distances with a scaling dependent upon the separation of the vertices in the model.

| Mar 12 1993 13:57:03 | lesa-interface.lisp | Page 1 |

```lisp
;;; -*- Mode:Common-Lisp; Package:IUW; Base:10; Fonts:(CPTFONT) -*-
;;;;;;;;;;;;;;;;;;;;;;;;;;;;;;;;;;;;;;;;;;;;;;;;;;;;;;;;;;;;;;;;;;;;;;;;;;;
;;;
;;;    Author:   Kashi Rao                                                 ;;;
;;;    Input:
;;;    Output:                                       ;;;
;;;    History:                                                            ;;;
;;;
;;;;;;;;;;;;;;;;;;;;;;;;;;;;;;;;;;;;;;;;;;;;;;;;;;;;;;;;;;;;;;;;;;;;;;;;;;;

(defmethod (recognition-interface :do-lesa)
           (n-list ipl
            &optional
            (mpl nil)
            (weak-perspective-p t))

(setf
    hypothesis-1 nil
    hypothesis-2 nil transformation-matrix-list
    (list (align::do-right-match n-list
                                 (or mpl (send model :points-for-match))
                                 ipl weak-perspective-p)))

(send self
        :align-to-save-hypotheses nil weak-perspective-p)

(if hypothesis-1 (send hypothesis-1 :lesa-parameters))
  (send self :show-hypotheses-no-grouping)

(send self :overlay-all-hypotheses
        nil (list hypothesis-1) 0
        t t auto-window
        image-edges)

(setf (send *description-interface* :auto-window)
        auto-window)

;;try not to refresh window after above and before doing stuff below (send *description-interface* :display-corners nil)
  (send self :project-all-points-for-match-of-model t hypothesis-1 w:red nil *dist-array* nil t)
  )

;(setq *ipl* '((92 24 1) (110 45 1) (80 29 1) (93 45 1) (76 42 1) (88 62 1) (66 52 1) (79 67 1)))

; (send *recognition-interface* :do-lesa '(2 4 5 6) *mpl* *ipl*)

;hypothesis-1 should keep info of the all the corr. image points and model
;now that there are more than 3
; correct the display of corr points ; compute the pose, scale and translation correctly

;-------------------------------------------------------------------------------

(defmethod (hypothesis :lesa-parameters)
           ()
  (setf alpha-rot-z
```

```
                                    Mar 12 1993 13:57:03          lesa-interface.lisp                    Page 2

(atan
          (- (aref transformation-matrix 1 0))
          (aref transformation-matrix 1 1))

gamma-rot-new-new-z
        (atan
          (aref transformation-matrix 1 2)
          (/ (aref transformation-matrix 1 1)
             (cos alpha-rot-z))
        )

scale
        (/ (aref transformation-matrix 1 2)
           (sin gamma-rot-new-new-z))

beta-rot-new-y
          (GET-BETA alpha-rot-z gamma-rot-new-new-z scale transformation-matrix)
        )

(send self :translation-params)
    )

;------------------------------------------------------------------------------
---------------

(defmethod (recognition-interface :lesa-parameters)
           ()
  (mapcar #'(lambda (hyp)
              (send hyp :lesa-parameters))
          all-hypotheses)
  )

;------------------------------------------------------------------------------
---------------

(defun get-beta (alpha gamma scale mat)
  (let* ((sin-beta
           (/ (- (aref mat 0 2))
              (* scale (cos gamma))))
         (cos-beta
           (/ (-
                (/ (aref mat 0 1) scale)
                (* sin-beta (sin gamma) (cos alpha))
              )
              (sin alpha)
           ))
        )
    (atan sin-beta cos-beta)
    ))

;------------------------------------------------------------------------------
---------------

(defmethod (hypothesis :check-lesa-params)
           ()
  (let* ((tmat
           (make-array '(4 4)
                       :initial-value 0)))
    (setf
      (aref tmat 0 0)
      (* scale
         ()))
))
)) ;
```

```
;;; -*- Mode:Common-Lisp; Package:ALIGN; Base:10 -*-
;;;;;;;;;;;;;;;;;;;;;;;;;;;;;;;;;;;;;;;;;;;;;;;;;;;;;;;;;;;;;;;;;;;;;;;;;;;;;;;;;
;;;
;;;    Author:  Kashi Rao                                                    ;;;
;;;    Input:
;;;    Output:                                                ;;;
;;;    History:                                                              ;;;
;;;
;;;;;;;;;;;;;;;;;;;;;;;;;;;;;;;;;;;;;;;;;;;;;;;;;;;;;;;;;;;;;;;;;;;;;;;;;;;;;;;;;

;--------------------------------------------------------------------------------
;-----------------------

(defun DO-RIGHT-MATCH (n-list mpl ipl &optional (weak-perspective-p t))
  (if n-list
      (let* ((this-mpl
               (mapcar #' (lambda (nn)
                            (nth nn mpl))
                       n-list))
             (this-ipl
               (mapcar #' (lambda (nn)
                            (nth nn ipl))
                       n-list))
             )
        (both-transforms this-mpl this-ipl weak-perspective-p)
        )
    (both-transforms mpl ipl weak-perspective-p)
    ))

;--------------------------------------------------------------------------------
;-----------------------

(defun both-transforms (model-point-list image-point-list &optional (weak-perspecti
ve-p t))
  (if weak-perspective-p
      (find-transform model-point-list image-point-list)
    (perspective-transform model-point-list image-point-list)
    ))

;--------------------------------------------------------------------------------
;-----------------------

(defun find-transform (model-point-list image-point-list)

;;;mpm is model-point-matrix, ipm is image-point-matrix (let* ((mpm
           (math::transpose-matrix
             (make-array ;;note we reverse the order of the dimensions to take care of the beh
aviour of initial-contents
               ;;hence, we transpose later (as above)

(list (list-length model-point-list) (list-length (car model-point-li
st)))
                         :initial-contents
                         model-point-list)))
         (image-point-matrix
           (math::transpose-matrix
             (make-array (list (list-length image-point-list) (list-length (car image
-point-list)))
                         :initial-contents
                         image-point-list)))

(mpm-transpose
```

```
                (math::transpose-matrix
                                mpm))
         (mpm-mpm-transpose
            (math::multiply-matrices mpm mpm-transpose))
         (inverse-of-mpm-mpm-transpose
            (inverse-matrix-4 mpm-mpm-transpose))
         (pseudo-inverse-mpm
            (math::multiply-matrices
               mpm-transpose
               inverse-of-mpm-mpm-transpose))

(transformation-matrix
               (math::multiply-matrices
                   image-point-matrix
                   pseudo-inverse-mpm))

(float-transformation-matrix
            (convert-to-artq-array
               (float-array transformation-matrix)))

(projected-points-matrix
            (math::multiply-matrices
               float-transformation-matrix
               mpm))
         (error-matrix
            (subtract-arrays
               projected-points-matrix
               image-point-matrix))
         )

(multiple-value-bind
         (abs-error-vector total-abs-error avg-of-col-sums)
           (ARRAY-OF-ABS-COLUMNS-TOTAL error-matrix)

;compute abs error vector for each image point
            ;then total abs error for each image point
            ;and then for the total abs error for the entire set (fsignal "stop")

;     (convert-to-4-by-4-array float-transformation-matrix)

(values
           float-transformation-matrix
           abs-error-vector
           total-abs-error
           avg-of-col-sums)
      )))
;--------------------------------------------------------------------------------
---------------------------
;notes:

;(setq pp (align::do-right-match '(2 3  4 6) *mpl* *ipl*))
;(setq oo (align::do-right-match '(2 3  5 6) *mpl* *ipl*))
; do alignment in recognition interface menu and create 2 hypotheses
;    (setf (send *recognition-interface* :transformation-matrix-list) (list oo pp))
; do from apply transforms to save hypotheses in rec. interface menu
;display using  corners projection and chamfer scores using
; (mapcar #'(lambda (ff) (send *description-interface* :display-corners nil) (send
*recognition-interface* :project-all-points-for-match-of-model t ff w:red nil *dist-
array* nil t) (shape::wait-if-no)) '(30 31 32 33 34 35 36 37))

;results:
;no answer for 1, 2, 3 point case (determinant zero)
```

```
; for 4 points inaccurate transforms
; 5 is good
;7 was good but not better than 5 point case ;-------------------------------------------------------------------------------
;------------------------
(defun array-of-abs-columns-total (from-array)
  "Find an array with values as sum of abs value of each column in from-array.
find the grand-sum of the abs values of all elements in from-array.
return array of sums and the grand-sum."

(let* (
         (no-of-cols (array-dimension from-array 1))
         (col-total-array
           (make-array no-of-cols
                       :element-type 'art-q
                       :initial-element 0.0))
         (grand-sum 0)
         (avg-of-col-sums 0)
         )
    (loop for col from 0 below no-of-cols do
          (let* ((sum 0))
            (loop for ro from 0 below (array-dimension from-array 0) do
                  (incf sum (abs (aref from-array ro col)))
                  )
            (setf
              (aref col-total-array col)
              sum)
            (incf grand-sum sum)
            ))
    (setf avg-of-col-sums
          (float (/ grand-sum no-of-cols)))
    (values col-total-array grand-sum avg-of-col-sums)
    ))

;-------------------------------------------------------------------------------
;------------------------
(defun subtract-arrays (from-array other-array)
  (let* ((result-array
           (make-array (array-dimensions from-array)
                       :element-type 'art-q
                       :initial-element 0.0)))
    (loop for ro from 0 below (array-dimension from-array 0) do
          (loop for col from 0 below (array-dimension from-array 1) do
                (setf
                  (aref result-array ro col)
                  (-
                    (aref from-array ro col)
                    (aref other-array ro col)
                    ))
                ))
    result-array
    ))

;-------------------------------------------------------------------------------
;------------------------
(defun float-array (inp-fix-array)
  (let* ((float-array
           (make-array (array-dimensions inp-fix-array)
                       :element-type 'single-float)
           ))
    (loop for ro from 0 below (array-dimension float-array 0) do
          (loop for col from 0 below (array-dimension float-array 1) do
                (setf
                  (aref float-array ro col)
                  (float
```

```
                        (aref inp-fix-array ro col))
                   )
              ))

float-array
      ))

;---------------------------------------------------------------------------
;-----------------------

(defun convert-to-4-by-4-array (3-by-4-array)
   (let* ((4-by-4-array
            (make-array (list 4 4)
                        :element-type 'art-q
                        :initial-element 0.0)
           ))
      (loop for ro from 0 to 1 do
            (loop for col from 0 to 3 do
                  (setf
                     (aref 4-by-4-array ro col)
                     (aref 3-by-4-array ro col))
                  ))
      (setf
         (aref 4-by-4-array 3 3)
         1.0)

4-by-4-array
      ))

;---------------------------------------------------------------------------
;-----------------------

;this fn not yet used krao 4/10/91

(defun convert-to-artq-array (inp-array)
   (let* ((new-array
            (make-array (array-dimensions inp-array)
                        :element-type 'art-q
                        :initial-element 0.0)
           ))
      (loop for ro from 0 below (array-dimension inp-array 0) do
            (loop for col from 0 below (array-dimension inp-array 1) do
                  (setf
                     (aref new-array ro col)
                     (aref inp-array ro col))
                  )))
      new-array
      ))

;---------------------------------------------------------------------------
;-----------------------
;krao 4/11/91

(defun 2-rows-as-lists (model-point image-point)
   (multiple-value-bind (xm ym zm) (values-list model-point)
     (multiple-value-bind (u v) (values-list image-point)
       (list
          (list xm ym zm   1 0 0  0 0 (- (* u xm)) (- (* u ym)) (- (* u zm)))
          (list 0  0  0    0 xm ym zm 1 (- (* v xm)) (- (* v ym)) (- (* v zm)))
          )
       ))
   )

;---------------------------------------------------------------------------
;-----------------------
```

```
Mar 12 1993 13:56:18                    lesa.lisp                          Page 5

(defun fill-camera-matrix (1d-matrix)
  "Return a 4by4 matrix with elements filled in from the 1d-matrix.
Both 4by4-matrix and 1d-matrix are special camera matrices with a
special mapping between the 2 as defined by this function."

(let* ((4by4-matrix
           (make-array '(4 4)
                       :type 'art-q
                       :initial-element 0.0)))
    (setf
      (aref 4by4-matrix 0 0) (aref 1d-matrix 0 0)
      (aref 4by4-matrix 0 1) (aref 1d-matrix 1 0)
      (aref 4by4-matrix 0 2) (aref 1d-matrix 2 0)
      (aref 4by4-matrix 0 3) (aref 1d-matrix 3 0)

(aref 4by4-matrix 1 0) (aref 1d-matrix 4 0)
      (aref 4by4-matrix 1 1) (aref 1d-matrix 5 0)
      (aref 4by4-matrix 1 2) (aref 1d-matrix 6 0)
      (aref 4by4-matrix 1 3) (aref 1d-matrix 7 0)

(aref 4by4-matrix 3 0) (aref 1d-matrix 8 0)
      (aref 4by4-matrix 3 1) (aref 1d-matrix 9 0)
      (aref 4by4-matrix 3 2) (aref 1d-matrix 10 0)

;;last element is 1 (by the normalization of the equations)

(aref 4by4-matrix 3 3) 1)

4by4-matrix
    ))
;------------------------------------------------------------------------
;-----------------------

(defun perspective-transform (model-point-list image-point-list)

(let* (
         (mp-ip-list
           (apply #'append
                  (mapcar #'2-ROWS-AS-LISTS
                          model-point-list image-point-list)))
         (mp-ip-m
           (make-array (list (* 2 (list-length model-point-list)) 11)
                       :initial-contents mp-ip-list))

(ip-list
           (apply #'append
                  (mapcar #' (lambda (image-point)
                              (list (list (car image-point)) (list (second image-po
int))))
                          image-point-list)))
         (ipm
           (make-array (list (* 2 (list-length image-point-list)) 1)
                       :initial-contents ip-list))

(left-pseudo-inverse-mp-ip-m
           (left-pseudo-inverse mp-ip-m))

(camera-transform
           (convert-to-artq-array
             (float-array
               (math::multiply-matrices
                 left-pseudo-inverse-mp-ip-m
                 ipm))))

(camera-transform-4by4-matrix
```

```lisp
            (FILL-CAMERA-MATRIX camera-transform))
          )

;(fsignal "perspective transform")

camera-transform-4by4-matrix
      ))
;-------------------------------------------------------------------------------
;------------------------

(defun square-array-p (inp-array)
   (apply #'=
          (array-dimensions inp-array)))

;-------------------------------------------------------------------------------
;------------------------

(defun left-pseudo-inverse (inp-mat)
   (if
     (square-array-p inp-mat)
     (math::invert-matrix (convert-to-artq-array inp-mat))
     (let* ( (inp-mat-transpose
              (math::transpose-matrix
                inp-mat))
            (inp-mat-transpose-times-inp-mat
              (math::multiply-matrices inp-mat-transpose inp-mat))

(inverse-of-inp-mat-transpose-times-inp-mat
              (math::invert-matrix inp-mat-transpose-times-inp-mat))

(left-pseudo-inverse-inp-mat
              (if
                inverse-of-inp-mat-transpose-times-inp-mat
                (math::multiply-matrices
                  inverse-of-inp-mat-transpose-times-inp-mat
                  inp-mat-transpose)
                ))
            )
         ;(fsignal "pseudo stop")

left-pseudo-inverse-inp-mat
       )
     ))
;(inv-mat-transpose-mat (inverse-matrix-n mat-transpose-mat))

;-------------------------------------------------------------------------------
;------------------------
```

What is claimed is:

1. A method of model-based image recognition, comprising the steps of:

(a) extracting image points from an input two-dimensional image;

(b) selecting a set of n of said image points extracted in step (a) and a set of n model points of a three-dimensional model in a class of K models, where n is a positive integer greater than or equal to 4 and K is a positive integer;

(c) computing a transformation of three dimensions to two dimensions based on said set of n model points and said set of n image points, said transformation a matrix $C=JW^T(WW^T)^{-1}$ where J is a 3×n matrix with each of the columns of J defined by a scaling factor plus the scaled two coordinates of one of said n points in said image and W is a 4×n matrix with each of the columns of W defined by a constant plus the three coordinates of one of said n points in said model;

(d) repeating steps (b)–(c) for all sets of n of said image points and all sets of n model points of a model of said class of models;

(e) selecting a hypothesized transformation from said transformations created by steps (b)–(d) wherein said hypothesized transformation is characterized by an error measured by CW−J of less than a predetermined threshold, but when none of said transformations has an error less than said predetermined threshold, selecting no transformation; and (f) indicating recognition of an object in said image and corresponding to the model including the n model points of said hypothesized transformation when a hypothesized transformation is selected in step (e), else indicating no model objects recognized in said image when no transformation is selected in step (e).

2. The method of claim 1, wherein:

(a) n is in the range of 5 to 7.

3. The method of claim 1, wherein:

(a) said image points are corners; and (b) said model points are vertices.

4. The method of claim 1, wherein:

(a) said selecting in step (c) of claim 1 includes picking said hypothesized transformation as a one of said transformations with an error not greater than the errors of others of said transformations.

5. The method of claim 1, wherein:

(a) when said set of n image points in step (b) of claim 1 are the points with coordinates $(u_1,v_1)$, $(u_2,v_2)$, $(u_3,v_3)$, ..., and $(u_n,v_n)$, form the 3×n matrix $$J = \begin{matrix} u'_1 & u'_2 & u'_3 & \cdots & u'_n \\ v'_1 & v'_2 & v'_3 & \cdots & v'_n \\ w & w & w & \cdots & w \end{matrix}$$

where $u_j'=u_j w$ with w a scale factor for weak perspective projection;

(b) when said set of n model points in step (b) of claim 1 are the points with coordinates $(x_1,y_1,z_1)$, $(x_2,y_2,z_2)$ ..., and $(x_n,y_n,z_n)$ form the 4×n matrix $$W = \begin{matrix} x_1 & x_2 & x_3 & \cdots & x_n \\ y_1 & y_2 & y_3 & \cdots & y_n \\ z_1 & z_2 & z_3 & \cdots & z_n \\ 1 & 1 & 1 & \cdots & 1 \end{matrix}$$

whereby the dummy row of 1s provides for translation of the image; and (c) said computing a transformation in step (c) of claim 1 yields a 3×4 matrix transformation matrix C by $C=JW^T(WW^T)^{-1}$.

6. The method of claim 5, wherein:

(a) said error is the sum of squares of the elements of the 3×n matrix CW−J.

7. The method of claim 6, further comprising the steps of:

(a) picking one of said transformations with transformation matrix C and error less than said predetermined threshold;

(b) selecting a further set of m of said model points from the model containing the n model points defining C, where m is a positive integer;

(c) computing a set of m hypothesized image points by applying C to said selected further m model points of step (b);

(d) selecting a set of m of said image points in addition to the n image points defining C;

(e) computing a preliminary verification error by the distances of said m hypothesized image points of step (c) from said corresponding m image points of step (d);

(f) repeating steps (b) through (e) for all sets of such m further model points and m further image points, and taking the smallest preliminary verification error as a verification error for C; and (g) repeating steps (a) through (t) for all of said transformations with error less than said predetermined threshold;

(h) wherein said selecting a hypothesized transformation of step (e) of claim 1 is picking a one of said transformations from step (g) with an error plus verification error not greater than the errors of others of said transformations.

8. The method of claim 6, further comprising the steps of:

(a) picking one of said transformations with transformation matrix C;

(b) selecting a further set of m of said model points from the model containing the n model points defining C, where m is a positive integer;

(c) computing a set of m hypothesized image points by applying C to said selected further m model points of step (b);

(d) selecting a set of m of said image points in addition to the n image points defining C;

(e) computing a preliminary verification error by the distances of said m hypothesized image points of step (c) from said corresponding m image points of step (d);

(f) repeating steps (b) through (e) for all sets of such m further model points and m further image points, and taking the smallest preliminary verification error as a verification error for C; and (g) repeating steps (a) through (f) for all of said transformations;

(h) wherein said selecting a hypothesized transformation of step (e) of claim 1 is picking a one of said transformations from step (g) with an error plus verification error not greater than the errors of others of said transformations.

9. The method of claim 6, further comprising the steps of:
(a) ranking said transformations with transformation matrix C and error according to error size with smaller error implying higher ranking;
(b) picking a highest ranking remaining transformation matrix C;
(c) selecting a further set of m of said model points from the model containing the n model points defining C, where m is a positive integer;
(d) computing a set of m hypothesized image points by applying C to said selected further m model points of step (c);
(e) selecting a set of m of said image points in addition to the n image points defining C;
(f) computing a preliminary verification error by the distances of said m hypothesized image points of step (d) from said corresponding m image points of step (e);
(g) repeating steps (c) through (f) for all sets of such m further model points and m further image points, and taking the smallest preliminary verification error as a verification error for C; and
(h) taking said selecting a hypothesized transformation of step (e) of claim 1 as the transformation of step (b) if said error plus verification error is less than a second predetermined threshold, else repeating steps (b) through (h).

10. A method of model-based image recognition, comprising the steps of:
(a) extracting image points from an input two-dimensional image;
(b) selecting a set of 3 of said image points extracted in step (a) and a set of 3 model points of a three-dimensional model in a class of K models, where K is a positive integer;
(c) computing a transformation of three dimensions to two dimensions based on mapping said set of 3 model points to said set of 3 image points, said transformation made of rotation, translation, and scaling;
(d) selecting a further set of k of said model points from the model containing the 3 model points defining said transformation, where k is a positive integer;
(e) computing a set of k hypothesized image points by applying said transformation to said selected further k model points of step (d);
(f) selecting a set of k of said image points in addition to the 3 image points defining said transformation;
(g) computing a preliminary error by the distances of said k hypothesized image points of step (e) from said corresponding k image points of step (f);
(h) repeating steps (d) through (g) for all sets of such k further model points and k further image points, and taking the smallest preliminary error as an error for said transformation;
(i) repeating steps (b) through (h) for all sets of 3 model points and 3 image points;
(j) selecting a transformation T from step (i) which has a minimal error;
(k) forming a transformation matrix C from the 3+k model points and corresponding image points defined by said transformation T from step (j) by pseudo-inverse;
(l) selecting a further set of m of said model points from the model containing the 3+k model points defining C, where m is a positive integer;
(m) computing a set of m hypothesized image points by applying C to said selected further m model points of step (l);
(n) selecting a set of m of said image points in addition to the 3+k image points defining C;
(o) computing a preliminary verification error by the distances of said m hypothesized image points of step (m) from said corresponding m image points of step (n);
(p) repeating steps (l) through (o) for all sets of such m further model points and m further image points, and taking the smallest preliminary verification error as a verification error for C; and
(q) indicating the recognition of an object in said image and corresponding to the model defining the transformation from step (p) when said verification error plus said error is less than a predetermined threshold, else repeating steps (j) through (q) for a transformation not previously selected, and when no transformation has verification error plus error less than said threshold indicating no model object recognized in said image.

11. The method of claim 10, wherein:
(a) k is in the range of 2 through 4.

12. The method of claim 10, wherein:
(a) said pseudo-inverse computation of step (k) of claim 10 is $C = JW^T(WW^T)^{-1}$ when the set of 3+k image points have coordinates $(u_1,v_1)$, $(u_2,v_2)$, $(u_3,v_3)$, ..., and $(u_{3+k},v_{3+k})$, to define the 3×3+k matrix $$J = \begin{matrix} u'_1 & u'_2 & u'_3 & \cdots & u'_{3+k} \\ v'_1 & v'_2 & v'_3 & \cdots & v'_{3+k} \\ w & w & w & \cdots & w \end{matrix}$$

where $u_j' = u_j w$ with w a scale factor for weak perspective projection, and when the set of 3+k model points are the points with coordinates $(x_1,y_1,z_1)$, $(x_2,y_2,z_2)$, ..., and $(x_{3+k},y_{3+k},z_{3+k})$, to define the 4×3+k matrix $$W = \begin{matrix} x_1 & x_2 & x_3 & \cdots & x_{3+k} \\ y_1 & y_2 & y_3 & \cdots & y_{3+k} \\ z_1 & z_2 & z_3 & \cdots & z_{3+k} \\ 1 & 1 & 1 & \cdots & 1 \end{matrix}$$

whereby the dummy row of 1s provides for translation of the image.

13. A model-based recognition system, comprising:
(a) an imager;
(b) a corner extractor coupled to an output of said imager;
(c) a memory containing a list of vertices for each of K models;
(d) a hypothesis generator with inputs coupled to an output of said corner extractor and to said list of model vertices, wherein for each set of n of said vertices from one of said models and each set of n corners extracted from an image by said corner extractor, said hypothesis generator generates a transformation by pseudo-inverse of the form $JW^T(WW^T)^{-1}$ where J is a 3×n matrix with each of the columns of J defined by a scaling factor plus the scaled two coordinates of one of said n points in said image and W is a 4×n matrix with each of the columns of W defined by a constant plus the three coordinates of one of said n points in said model, n is a positive integer greater than or equal to 4;

(e) a hypothesis verifier with input coupled to an output of said hypothesis generator, wherein for each set of m additional vertices from said one of said models and m additional corners said hypothesis verifier compares an error between the image points of said transformation applied to said n vertices plus said m additional vertices and said n corners plus said m additional corners; and (f) an object recognition indicator with input coupled to an output of said hypothesis verifier and indicating recognition of an object in an image output by said imager and corresponding to the model of said n vertices plus said m additional vertices when said error is less than a predetermined threshold.

14. The system of claim 13, wherein:

(a) said pseudo-inverse of element (d) of claim 13 is $JW^T(WW^T)^{-1}$ when the set of n image points have coordinates $(u_1,v_1), (u_2,v_2), (u_3,v_3), \ldots,$ and $(u_n,v_n)$, to define the 3×n matrix $$J = \begin{matrix} u'_1 & u'_2 & u'_3 & \cdots & u'_n \\ v'_1 & v'_2 & v'_3 & \cdots & v'_n \\ w & w & w & \cdots & w \end{matrix}$$

where $u_j' = u_j w$ with w a scale factor for weak perspective projection, and when the set of n vertices are the points with coordinates $(x_1,y_1,z_1), (x_2,y_2,z_2), \ldots,$ and $(x_n,y_n,z_n)$ to define the 4×n matrix $$W = \begin{matrix} x_1 & x_2 & x_3 & \cdots & x_n \\ y_1 & y_2 & y_3 & \cdots & y_n \\ z_1 & z_2 & z_3 & \cdots & z_n \\ 1 & 1 & 1 & \cdots & 1 \end{matrix}$$

whereby the dummy row of 1s provides for translation of the image.

* * * * *